US008863695B1

(12) United States Patent
DelValle

(10) Patent No.: US 8,863,695 B1
(45) Date of Patent: Oct. 21, 2014

(54) CUBRA AVIAN SHELTER

(76) Inventor: Geovanny DelValle, San Juan, PR (US)

( * ) Notice: Subject to any disclaimer, the term of this patent is extended or adjusted under 35 U.S.C. 154(b) by 0 days.

(21) Appl. No.: 13/561,065

(22) Filed: Jul. 29, 2012

Related U.S. Application Data

(60) Provisional application No. 61/513,553, filed on Jul. 30, 2011.

(51) Int. Cl.
*A01K 31/18* (2006.01)

(52) U.S. Cl.
USPC .......................................... 119/437; 119/487

(58) Field of Classification Search
USPC ......... 119/416, 417, 428, 429, 430, 431, 436, 119/437, 452, 453, 454, 455, 456, 472, 474, 119/475, 482, 487, 489, 491, 493, 494, 495, 119/496, 498, 500; 206/503, 504; 220/23.4, 220/4.26, 23.6
See application file for complete search history.

(56) References Cited

U.S. PATENT DOCUMENTS

| | | | | | |
|---|---|---|---|---|---|
| 788,163 | A | * | 4/1905 | Mitchell | 119/487 |
| 1,099,599 | A | * | 6/1914 | Hartnell | 52/81.6 |
| 1,104,197 | A | * | 7/1914 | Kramer | 119/437 |
| 1,159,323 | A | * | 11/1915 | Maltby | 119/487 |
| 1,186,326 | A | * | 6/1916 | Moore | 119/437 |
| 1,616,781 | A | * | 2/1927 | Bugenhagen | 119/487 |
| 1,848,690 | A | * | 3/1932 | Bayley et al. | 52/82 |
| 1,924,480 | A | * | 8/1933 | Bayley | 119/437 |
| 1,981,418 | A | * | 11/1934 | Kreutzer | 119/436 |
| 4,342,393 | A | * | 8/1982 | Box | 206/504 |

* cited by examiner

*Primary Examiner* — Trinh Nguyen
(74) *Attorney, Agent, or Firm* — Luis Figarella

(57) ABSTRACT

An avian shelter comprising a top or bottom cover portion designed to engage with one or more wall sections to form a stackable enclosure, including an access opening adapted to provide privacy and access to the interior of the cage enclosure. Optional complementary locking members are disposed on the outer surfaces to provide the ability to secure one or more said enclosures to each other.

12 Claims, 11 Drawing Sheets

916
920

CUBRA AVIAN SHELTER

CROSS-REFERENCE TO RELATED APPLICATIONS

This application claims priority to U.S. provisional patent application Ser. No. 61/513,553 titled "The CUBRA Avian Shelter" filed on Jul. 30, 2011, the disclosure of which is herein incorporated by reference in its entirety.

PATENTS CITED

The following documents and references are incorporated by reference in their entirety, Peironnet (U.S. Pat. No. 959, 161), Kyte (U.S. Pat. No. 4,424,641), Shreve (U.S. Pat. No. 1,238,349), Moore (U.S. Pat. No. 1,186,326), Drake (U.S. Pat. No. 1,227,401), Bruggerman (U.S. Pat. No. 3,721,213), Box (U.S. Pat. No. 4,342,393), Kramer (U.S. Pat. No. 1,104, 197), Matlby (U.S. Pat. No. 1,159,323), Wazeter (U.S. Pat. No. 4,917,047) and Green (U.S. Pat. No. 1,177,861).

FIELD OF THE INVENTION

The present invention relates to the field of animal enclosures, and in particular to an apparatus and method for constructing enclosures for small animals such as birds and rodents.

DESCRIPTION OF THE RELATED ART

There have been many avian, poultry and other small animals' enclosures, cages and housing embodiments over time. Beginning with Staunton U.S. Pat. No. 366,697 (ca. 1887), there are many embodiments of avian housing designs suitable for the construction of cages for birds and other avian creatures, particularly chickens. In particular, there is a need to keep the birds in a clean environment, while at the same time using the space efficiently. Any such enclosure must not only provide for the safe storage of the animal, as is the case when transporting them, but also provide an environment where the animal may thrive and feel at home. For example, we see in Peironett (U.S. Pat. No. 959,161) it is well known that chickens and other birds prefer to 'nest' when laying their eggs, that is, they desire to be in a restricted area, preferably darker, in order to lay their eggs in an environment they feel is secure to their potential offspring.

Within certain portions of the population, the animals are raised not only to be consumed for their meat or their eggs, but also for ancillary purposes. Such is the when the animals must be kept separate from other chickens, particularly in the case of roosters. Cockfighting, while banned in the US, is nevertheless very popular and common among Asian nations, as well as in former Spanish colonies across the world, including such US possessions as Guam and Puerto Rico.

In that endeavor, raising fighting roosters requires the provisioning of separate enclosures to keep one male, as well as a number of females. A very common enclosure, is the provisioning of a circular enclosure made from wire-mesh (aka chicken wire), covered by a flat piece of wood or a piece from a zinc roof slab. Such enclosures are, however, hard to stack upon one another, do not provide any privacy for the animals, and run the risk while handling the animal of it escaping. What is needed, is an enclosure that allows for potential access to the interior through a door, a privacy enclosure for the bird, and the ability to stack two or more units.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

In one aspect the invention is about a poultry cage component comprising a horizontal assembly designed to cover the upper portion of an enclosure, said horizontal assembly comprising at least one central hub and one or more eaves extending radially from said hub; and one or more rims extending down at the edge of said eaves. In another aspect, it is about the cage component further comprising one or more side shelters disposed around the periphery of said horizontal assembly, said side shelters having one or more openings facing the enclosure side, and one or more external openings, each said external opening having one or more covers. In yet another aspect, said horizontal assembly is made primarily of sheet metal. In another aspect, said horizontal assembly and one or more of said side shelters are made primarily of sheet metal. In yet another aspect, the horizontal assembly is made primarily of plastic. In another aspect, the horizontal assembly and one or more side shelters are made primarily of plastic.

In one aspect, the invention is about an enclosure comprising a horizontal assembly designed to cover the upper portion of an enclosure, said horizontal assembly comprising at least one central hub and one or more eaves extending radially from said hub, one or more rims extending down at the edge of said eaves, one or more side shelters disposed around the periphery of said horizontal assembly, said side shelters having one or more openings facing the enclosure side, and one or more external openings, each said external opening having one or more covers; and walls placed below said horizontal enclosure along it's complete perimeter, said walls having an opening suitable to closely mate with the side shelter profile.

In another aspect said horizontal assembly and one or more of said side shelters are made primarily of sheet metal; and said walls are made primarily of chicken wire-type material. In another aspect, the In yet another aspect, said horizontal assembly and one or more of said side shelters are made primarily of plastic. In another aspect, a fluid delivery system connected to said horizontal assembly designed to cover the upper portion of said enclosure. In another aspect, a bottom portion is formed from a horizontal assembly.

In one aspect, the invention is about an animal enclosure horizontal assembly designed to cover the upper portion of an enclosure, said horizontal assembly comprising a primary cover surface shaped to cover the enclosure area, cross member brackets designed to span the inside area of said cover; and a nest housing attached to said cover surface through at least one folding wall shared with the outer edge of said cover. In another aspect, said horizontal assembly and nest housing are made primarily of plastic.

Other features and advantages of the present invention will become apparent upon examining the following detailed description of an embodiment thereof, taken in conjunction with the attached drawings.

The above-described and other features will be appreciated and understood by those skilled in the art from the following detailed description, drawings, and appended claims.

DETAILED DESCRIPTION OF THE PREFERRED EMBODIMENT

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Figure 1:
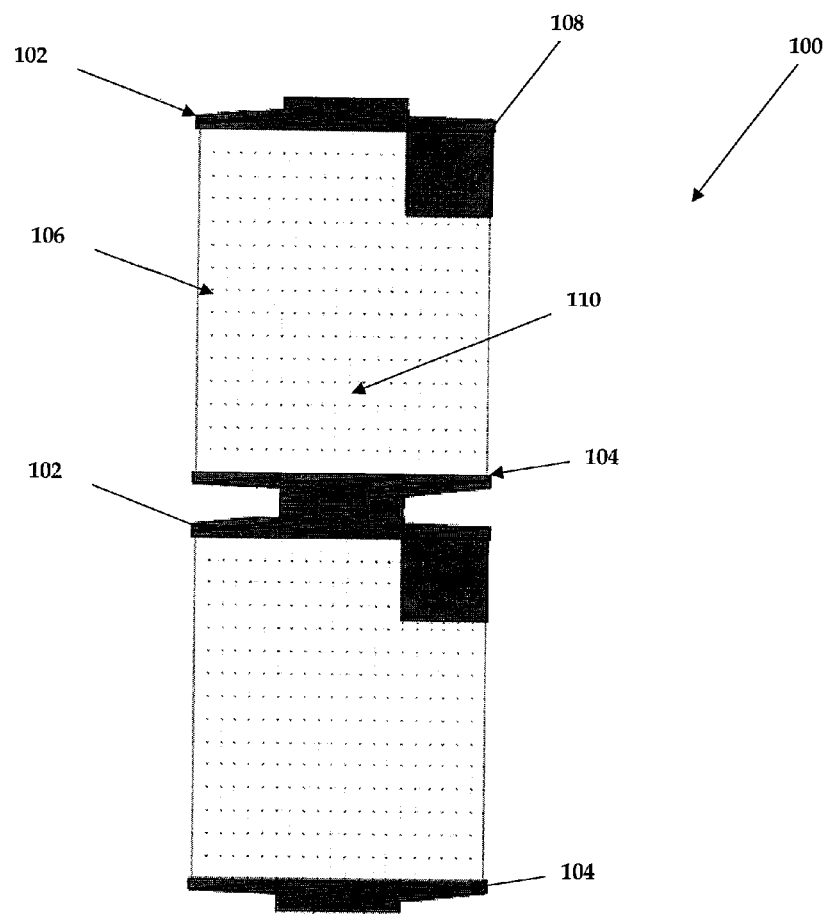
FIG. 1 shows stacked CUBRA shelters according to an exemplary embodiment of the invention.

Referring to FIG. 1, we see a potential embodiment 100 of the invention. In it, a horizontal assembly serves as either a cover 102 or alternatively bottom 104, of a shelter structure or enclosure, whose walls 106 are formed from either wire mesh, chicken wire, mesh, material with opening, transparent material, material with openings in it, or even a solid material.

Chicken wire or poultry netting is a mesh of wire, commonly used to fence poultry livestock. It is made commonly made of thin, flexible galvanized wire, with hexagonal gaps. Typically available 1.25 cm, 2.5 cm. or 5 cm. opening diameter, and in gages ranging from about 0.7 mm thick wire (22 gauge) to 1 mm wire (19 gauge). In the case of embodiments of this invention, wire thickness should be enough to support the weight of the cover 102, or alternatively support beams may be used.

Figure 2A:
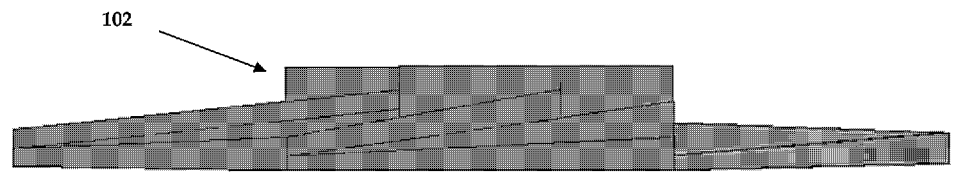
FIGS. 2A-2B show the CUBRA cover in two configurations, according to illustrative embodiment of the invention.
Figure 2B:
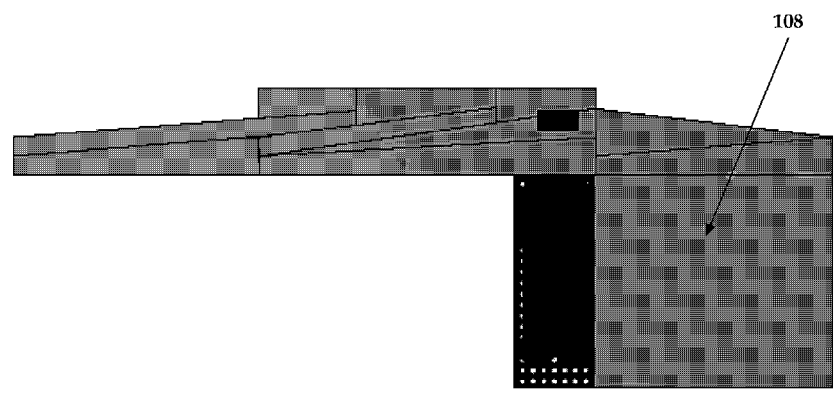
Figure 3:
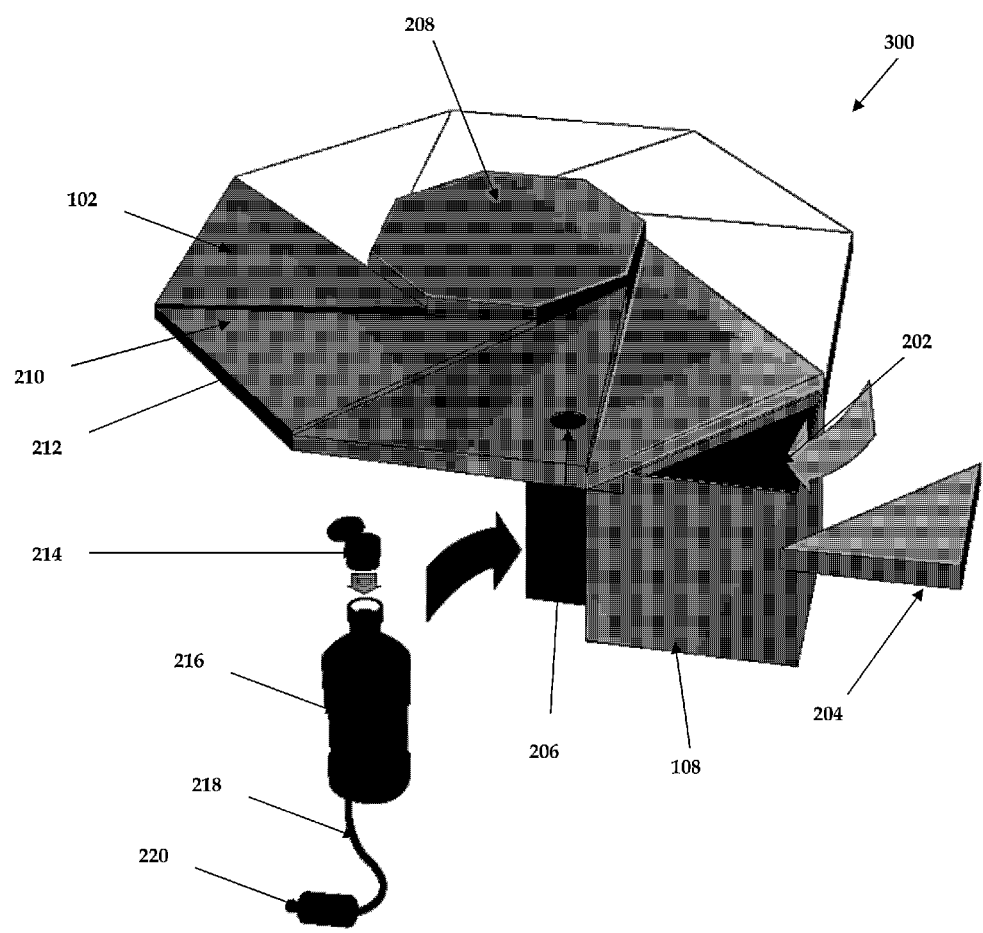
FIG. 3 shows a complete assembled CUBRA cover, according to an illustrative embodiment of the invention.

While a round embodiment is shown, the horizontal assembly may also be elliptical, square, rectangular or any other suitable shape. The cover 102, bottom 104 and walls 106 form an enclosure within which the animal is housed. An optional side shelter 108 allows access to the interior 110 of the enclosure, as well as shelter for the animal. As seen in FIGS. 2A-2B, the front view of the top 102 may be used separately from the additional optional shelter 108, Referring to FIG. 3, we see an isometric view 300 of the cover 102 and optional shelter housing or nest 108. In one embodiment, the cover 102 is formed having a central hub 208 and one or more eaves 210 extending from it. The rim or edge 212 is bent, so as to provide a rim against which the traditional wall material (chicken wire) is secured. In one embodiment, this is accomplished by gravity, with the weigh of the cover 102 keeping it resting on the cage wall 106. In an alternate embodiment, tie wraps, screws or other securing means are used to secure the top of the wire wall 106 to the inside/outside of said rim 212.

The optional side shelter 108 forms a cavity having one or more openings to the enclosure side cavity or interior 110, and one or more external openings 202 to the outside of the enclosure. Each said external opening has one or more doors or covers 204. In this fashion, a human may insert his hand into the external opening 202 and reach the enclosure interior 110, both of the shelter 108 and or the enclosure proper. As an option, one or more openings 206 are provided in one or more of the eaves 210. In one embodiment, this serves as a drain hole when the assembly is used as a floor or bottom 104, so that feces and other body fluids may drain either via the sides or the opening.

When the assembly is used as a cover 102, the opening 206 may be fitted a fluid delivery system, wherein an adapter 214 for connection to a fluid container 216 is fitted. In one embodiment, this container 216 may be a 2-liter soda bottle whose bottom has a tube 218 connecting to an automatic water dispensed 220.

In alternate embodiment, the central hubs 208 of the top 102 resting on a bottom 104 may be hollowed, allowing for the animal to move vertically from one assembly to the next. While a ladder or other climbing pole may be provided, many non-flying fowl (including chickens) are capable of flying a short distance up/down. Even when the animal is incapable of flying long distances (as are chickens), it is interesting to note that they are well capable of jumping/flying three to five times their height. In fact, something they do constantly at night when looking for protection from ground predators, at which time they tend to jump on low lying branches. The CUBRA takes advantage of this by providing a nest that is enclosed, off the ground (obviating the need for stairs). In an alternate embodiment, a swinging bar may also be provided.

Figure 4:
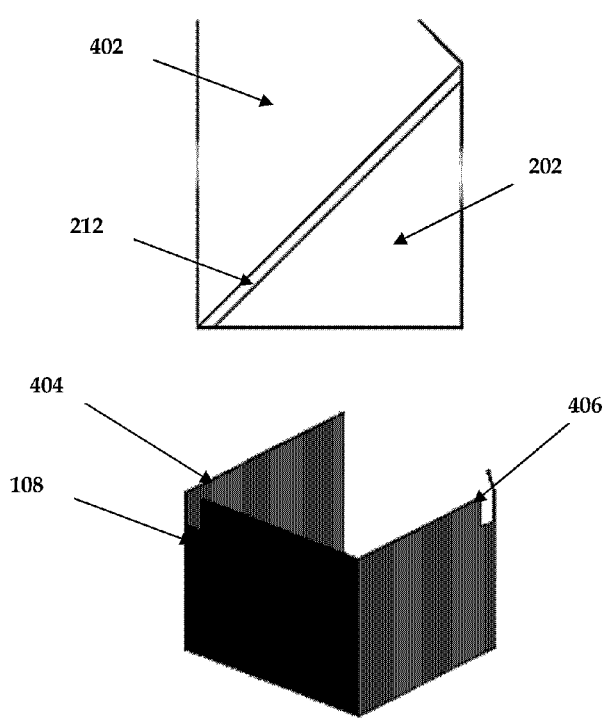
FIG. 4 illustrates one embodiment of the nest area, according to an illustrative embodiment of the invention.

The nest or shelter 108 (FIG. 4) may be formed by bending three or more sides of a solid material, allowing for notches 404, 406 to serve as the seating of the rim 212, leaving the opening 202 outside the enclosure, and the nest 402 area inside.

Figure 5:
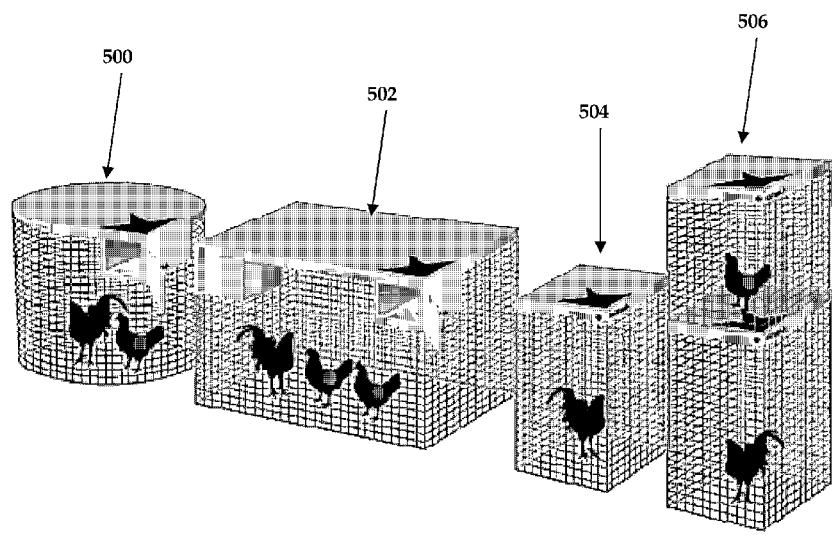
FIG. 5 shows a number of possible models, according to illustrative embodiments of the invention.

In an alternate embodiment, FIG. 5 the enclosure is shown as round 500 or rectangular 502, with the cover containing two or more nests or shelters, useful in cases where multiple hens are enclosed with or without a rooster. Square or other shaped layouts may also be embodied 504. As seen, 506, rectangular covers may be used to stack one unit on another. In addition, notice that the implementations may include use of only covers 102, without bottoms. Again, in an alternate embodiment there may be openings between "floors" to encourage animal interaction.

Figure 6:
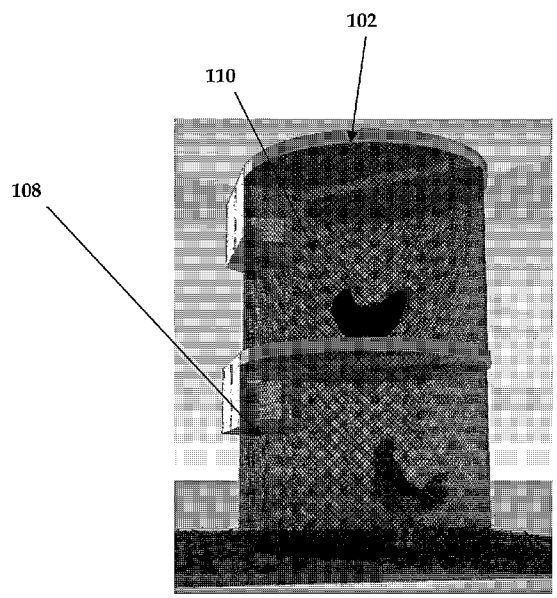
FIGS. 6-7 show stacked CUBRA shelters according to an exemplary embodiment of the invention.
Figure 7:
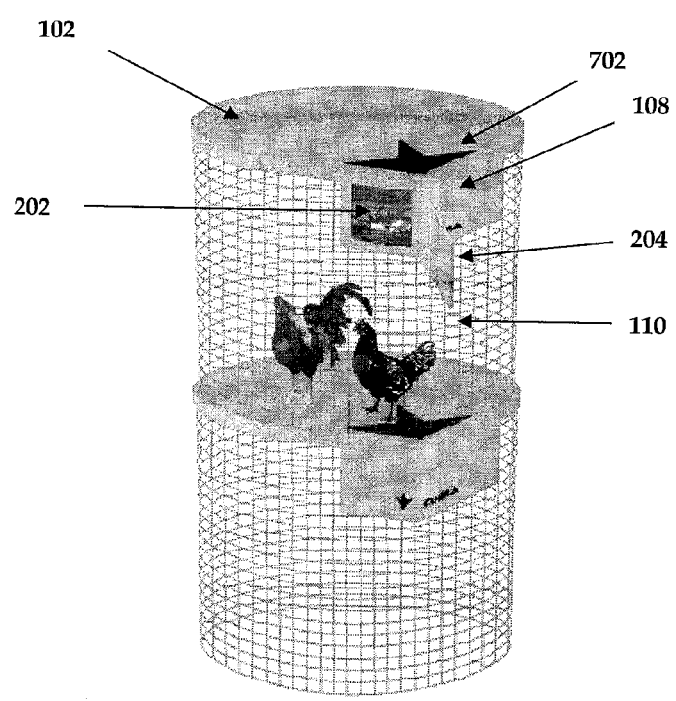
Figure 8:
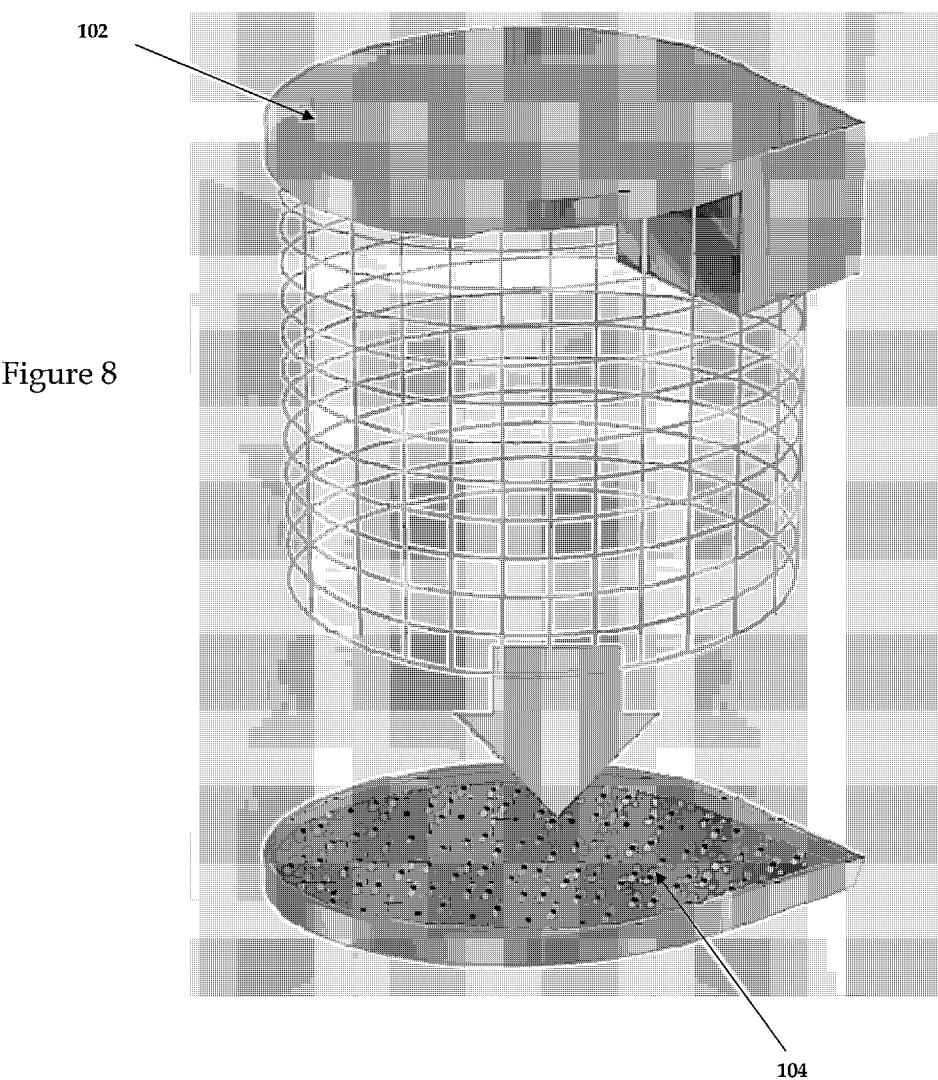
FIG. 8 shows an alternate embodiment of the covers and bottom, according to an illustrative embodiment of the invention.

Referring to FIGS. 6-8, we see another round cage embodiment. The cover 102 forms a cap or lid that attaches to the wire cage, wire mesh or other suitable enclosure material 110. The complete assembly rests on top of another cover 102. Of necessity, the wire mesh is removed or bent to fit around the outside nest or shelter 108. In one embodiment, the nest structure is a parallelogram. In an alternate embodiment, it may be circular, semicircular or even amorphous, per the preference of the species being caged.

The nest structure 108 performs a number of functions. First, it provides an in/out access point to the inside of the enclosure, via the outside opening 202 (normally covered by the closable door 204). Second, it provides a place for the avian to lay their eggs during that phase of their physiological period. In the case of chickens, it is well understood that they prefer laying eggs in nest cavities. Access from the enclosure to the nest is provided by an opening 402 inside the enclosed space. While feeding the animal is normally done through the wire mesh, the nesting structure provides an additional way to feed them, as well as way to remove eggs and tend to any diseased animal.

In one embodiment, the unit is formed from a ferrous or non-ferrous metal, and formed from a sheet metal blank which is bent at the appropriate angles. In an alternate embodiment, the same is accomplished using a plastic sheet, which is either bent or preformed using vacuum. Other embodiments include impregnated cellulose sheets.

In an alternate embodiment, the unit is formed from a specially pre-cut form 400. Referring to FIGS. 9 to 14, a pre-cut form is shown. In one embodiment, the form 400 is comprised of a material such as plastic (be it a thermoplastic or thermosetting polymer (examples of these include polyethylene, polystyrene, polyvinyl chloride, polypropylene and polytetrafluoroethylene (PTFE). These would include materials such as nylon, Plexiglas, and others). In an alternate embodiment, the p-member may be comprised of a carbon composite, metal, wood, bone, paper impregnated with moisture control agents or any composite thereof, or any material capable of supplying a sturdy, stable and cost effective surface.

Figure 9:
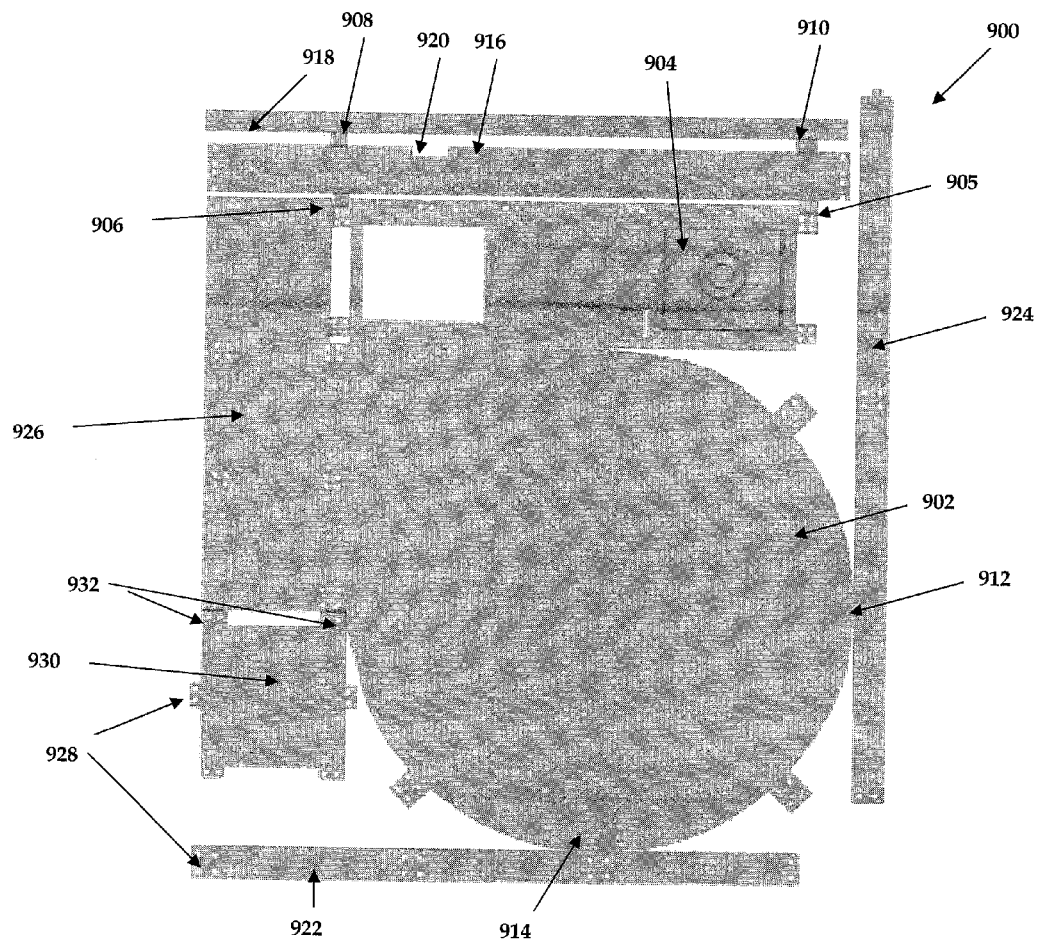
FIGS. 9-14 illustrate the assembly of a complete CUBRA cover, according to an illustrative embodiment of the invention.
Figure 10:
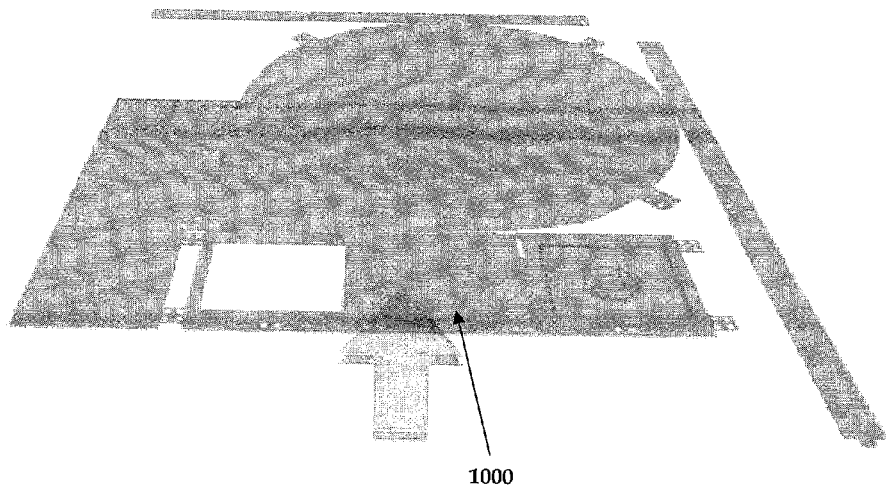
Figure 11:
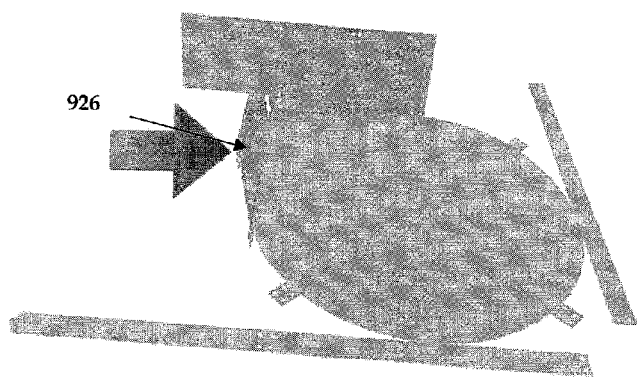
Figure 12:
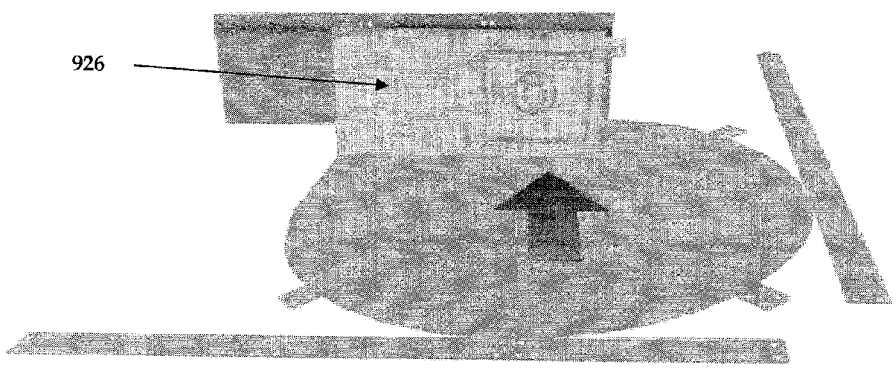
Figure 13:
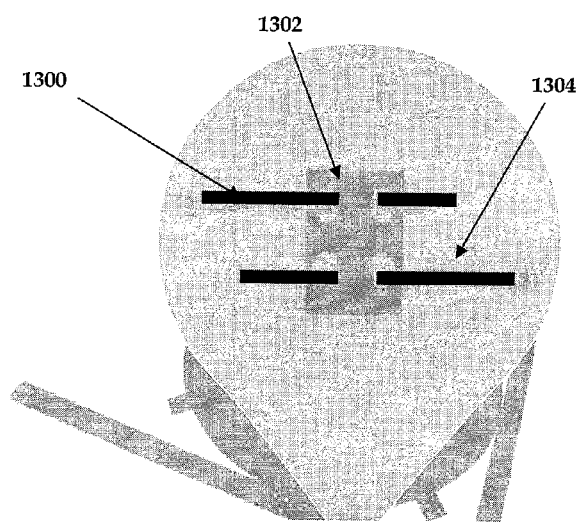
Figure 14:
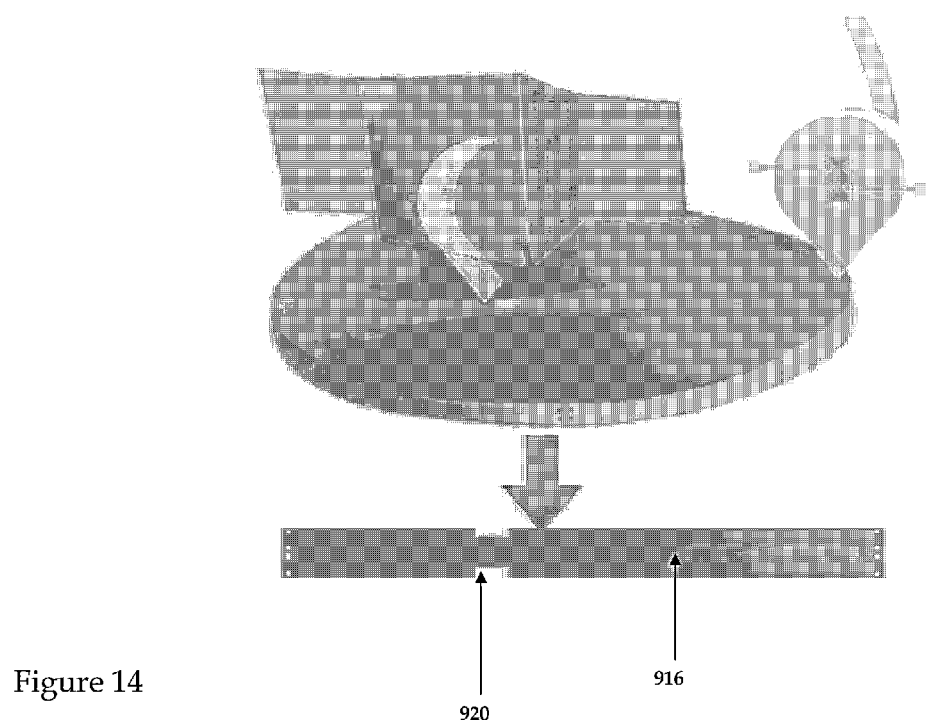

Referring to FIG. 9, in one embodiment, the CUBRA cutout form 900 arrives flat for assembly. The primary cover surface 902 is shaped round in one embodiment, although as mentioned before, it may have a square, rectangular, polyhedral or even random shape in alternate embodiments. The nest structure 108 is un-folded 926, but attached by solid foldable extensions (e.g. 912, 914) to the cover surface 902 as well as the rims 922, 924. Cross member brackets 916, 918 are attached to the cutout 900, but designed to be cut off with any cutting tool, such as a knife, scissor, box cutter, etc. The variable opening to the inside of the cage for the nest 904 is outlined for ease of cutting by the assembler. In one embodiment, they may be pre-formed to assist in cutting. A number of precut openings 928 are fitted into the assembly at various points for tie-wrap or similar securing.

To begin assembly, the assembler separates the brackets 916, 918 by cutting the tabs 905, 906, 908, 910. Note the precut hinge point 920, to accommodate the crossing of one bracket over another when finally assembled, by the separation of the door 930 at the tabs 932. Referring to FIGS. 10-14, when using the CUBRA as a chicken coop, the next step is the cutting of the inside opening 904 for the nesting structure along the larger opening. For medium sized birds the cut is along the middle opening outline. Finally, if hosting small birds the recommended opening is the smallest. Of course, the client may modify these later to his/her liking via the use of a cutting instrument.

In the above embodiment, once the CUBRA is separate from the other components, assembly of the nesting structure is accomplished via the folding of its walls, and the securing of the components via tie wraps or other similar means 1300, 1304 crossing a tab 1302. The walls 1000 fold up and create the inside of the nest 926. Using this cross linking, the ends of the rims 922, 924 tie at the point where they respectively end and match the tab built into the CUBRA top. The inner cross member 916 is similarly attached at its ends to the rim, and the final cross member 918 completes the structure.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

The invention claimed is:

1. A poultry cage component comprising;
a horizontal assembly designed to cover the upper portion of an enclosure, said horizontal assembly comprising at least one flat topped central hub suited to support above its top surface a similar horizontal assembly, and one or more eaves extending radially from said hub;
one or more rims extending down at the edge of said eaves;
one or more side shelters connected to the bottom of said horizontal assembly and disposed around the periphery of said horizontal assembly, said side shelters having one or more openings facing the enclosure side, and one or more external openings, each said external opening having one or more covers.

2. The cage component of claim 1 wherein;
said horizontal assembly is made primarily of sheet metal.

3. The cage component of claim 2 wherein;
said horizontal assembly and one or more of said side shelters are made primarily of sheet metal.

4. The cage component of claim 1 wherein;
said horizontal assembly is made primarily of plastic.

5. The cage component of claim 4 wherein;
said horizontal assembly and one or more side shelters are made primarily of plastic.

6. An enclosure comprising;
a horizontal assembly designed to cover the upper portion of an enclosure, said horizontal assembly comprising at least one central hub and one or more eaves extending radially from said hub;
one or more rims extending down at the edge of said eaves;
one or more side shelters connected to the bottom of said horizontal assembly and disposed around the periphery of said horizontal assembly, said side shelters having one or more openings facing the enclosure side, and one or more external openings, each said external opening having one or more covers; and
walls placed below said horizontal enclosure along said enclosure's complete perimeter, said walls having an opening suitable to closely mate with the side shelter profile.

7. The enclosure of claim 6 wherein;
said horizontal assembly and one or more of said side shelters are made primarily of sheet metal; and
said walls are made primarily of chicken wire-type material.

8. The enclosure of claim 7 further comprising;
a fluid delivery system connected to said horizontal assembly designed to cover the upper portion of said enclosure.

9. The enclosure of claim 8 further comprising;
a bottom portion is formed from a horizontal assembly.

10. The enclosure of claim 6 wherein;
said horizontal assembly and one or more side shelters are made primarily of plastic; and
said walls are made primarily of chicken wire-type material.

11. The enclosure of claim 10 further comprising;
a fluid delivery system connected to said horizontal assembly designed to cover the upper portion of said enclosure.

12. The enclosure of claim 11 further comprising;
a bottom portion is formed from a horizontal assembly.

\* \* \* \* \*